United States Patent [19]

Mackereth

[11] Patent Number: 4,574,302
[45] Date of Patent: Mar. 4, 1986

[54] TELEVISION SIGNAL ENCODER

[75] Inventor: Thomas C. Mackereth, Cambridge, England

[73] Assignee: U.S. Philips Corporation, New York, N.Y.

[21] Appl. No.: 558,730

[22] Filed: Dec. 6, 1983

[30] Foreign Application Priority Data

Dec. 10, 1982 [GB] United Kingdom ............... 8235333

[51] Int. Cl.[4] ............................................. H04N 9/455
[52] U.S. Cl. .................................. 358/21 R; 358/150; 358/12
[58] Field of Search ................ 358/11, 12, 13, 21 R, 358/23, 24, 148, 150

[56] References Cited

U.S. PATENT DOCUMENTS

| 3,947,826 | 3/1976 | Bockwoldt | 358/11 |
| 4,438,452 | 3/1984 | Powers | 358/13 |
| 4,500,908 | 2/1985 | Mandeberg | 358/13 |

Primary Examiner—Michael A. Masinick
Attorney, Agent, or Firm—Thomas A. Briody; William J. Streeter; Marianne Rich

[57] ABSTRACT

A television signal encoder for luminance and chrominance signals presented in digital form comprises luminance and chrominance channels in which the blanking and color burst signals are inserted digitally before the signals are converted to analogue form for modulation and transmission. The luminance signal is presented to a buffer circuit (2) and during the line period the output of the buffer circuit (2) is fed to a DAC (6) via a highway (5) under the control of an enable signal. During the blanking period a ROM (26) applies a digital version of the blanking level to the highway (5). A ROM (3) is enabled for a short period at the start and finish of the blanking period and is arranged as a variable multiplier to determine the slope of the blanking waveform. The output of the DAC (6) is filtered (8) and it is added to the modulated color subcarrier signal and the synchronizing pulse. The chrominance channel is basically similar to the luminance channel but includes means for demultiplexing the U and V signals and a further ROM for inserting the color burst amplitude. The U and V signals after filtering are fed to modulators to modulate the color subcarrier signal.

7 Claims, 6 Drawing Figures

TELEVISION SIGNAL ENCODER

BACKGROUND OF THE INVENTION

1. Field of the Invention

The invention relates to apparatus for producing a composite video signal from digital colour difference and luminance signals.

2. Description of The Prior Art

In a conventional encoder the digital colour difference (R-Y and B-Y) signals are demultiplexed and applied to digital to analogue converters (DACs). The outputs of the DACs are combined with the burst gate signal in respective combining circuits whose outputs are fed to the signal inputs of respective modulators. The colour subcarrier signal is fed to a quadrature phase generator to produce two output signals differing in phase from each other by 90°, these output signals being fed to the carrier inputs of the respective modulators. The signal fed to the R-Y modulator is fed through a switchable phase inversion circuit which is switched to invert the phase on alternate lines. The outputs of the modulators are fed to a combining circuit together with the luminance signal which is also converted in a DAC to an analogue signal. The combined signal is subsequently blanked and the synchronising pulse are added to produce the composite signal.

With this system extreme care has to be taken in the design of the circuits for producing the phase inversion of the colour subcarrier and in accurately blanking the video signal. The circuits usually used for performing both these functions are based on the use of balanced modulators. The phase inversion produced is usually accurate in phase but the amplitude is not so accurately controlled and produces a resultant phase error after encoding. This phase error produces a visible effect on display known as "twitter". Blanking requires a shaping filter and careful design of the blanking modulator to maintain a good blanked state and to remove spikes or out-of-balance effects during the transitions between the unblanked and blanked states. Consequently these circuits tend to be complicated and expensive to produce.

It is to be noted that the foregoing applies, strictly speaking, for the PAL colour television system but that similar difficulties also arise with other systems.

SUMMARY OF THE INVENTION

It is an object of the invention to provide an arrangement for producing a composite video signal from colour difference and luminance signals presented in digital form which mitigates one or more of the problems in conventional encoders.

The invention provides an arrangement for producing a composite video signal from colour difference and luminance signals wherein the colour difference and luminance signals are blanked before their conversion to analogue form.

By blanking the colour difference and luminance signals before their conversion to analogue signals the timing of the blanking period can be tied to the sampling frequency of the digital clock. With a sampling frequency of 13.5 MHz there are 864 clock periods during each line period for the 625 line system-I PAL signal and hence the blanking periods can be synchronised with particular pulses within the 864 clock period cycle.

In such an arrangement means may be provided for adding a colour burst signal to the blanked colour difference signals before conversion into analogue form. Further, means may be provided for inverting one of the colour difference signals before converting that colour difference signal to analogue form.

The means for blanking the colour difference signals may comprise a first read only memory or a first section of a read only memory to which the colour difference signals are applied as an input address; means for applying an enable signal to the read only memory, the enable signal being present for the periods of transition from the unblanked to blanked and the blanked to unblanked states; means for applying further address signals to the read only memory during said transition periods, said read only memory being arranged to produce outputs equal to preset percentages of the colour difference signals, which percentages are determined by the further address signals; and a second read only memory or a second section of the first mentioned read only memory programmed to give an output equal to a digital equivalent of the blanking level, said second read only memory or second section of the first read only memory being enabled between the transition periods from the unblanked to blanked states and the blanked to unblanked states.

The means for generating the colour burst signal may comprise a third read only memory or a third section of the first read only memory; an amplitude setting circuit for generating addresses for said third read only memory or third section of the first read only memory; and means for feeding an enable signal to said third read only memory or third section of the first read only memory, the enable signal defining the period.

BRIEF DESCRIPTION OF THE DRAWING

An embodiment of the invention will now be described, by way of example, with reference to the accompanying drawings, in which.

DESCRIPTION OF THE PREFERRED EMBODIMENT

Figure 1A:
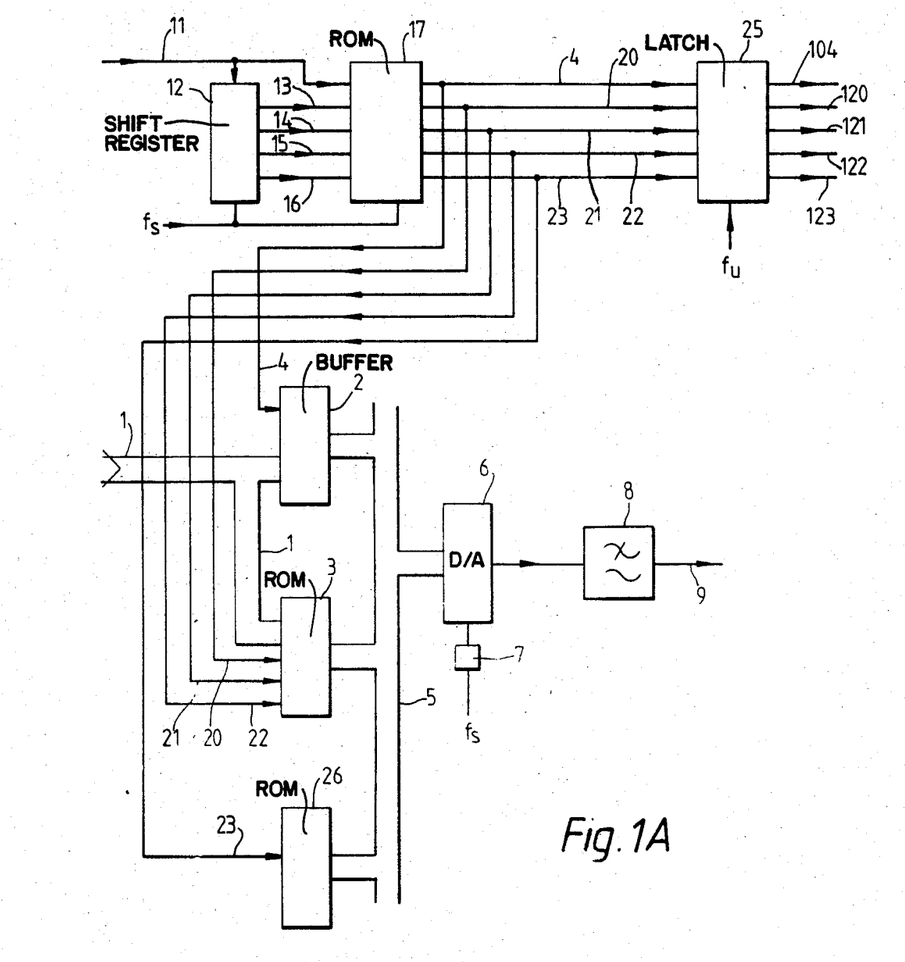
FIGS. 1A, 1B and 1C show in block schematic form an embodiment of the circuit arrangement according to the invention for producing a composite video signal.
Figure 1B:
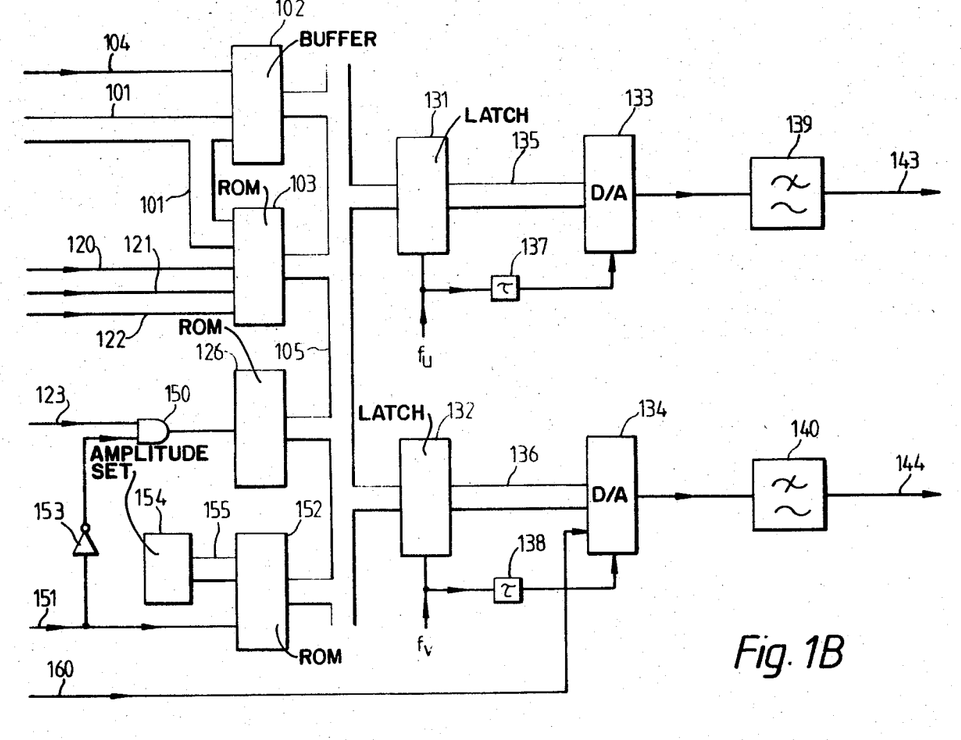
Figure 1C:
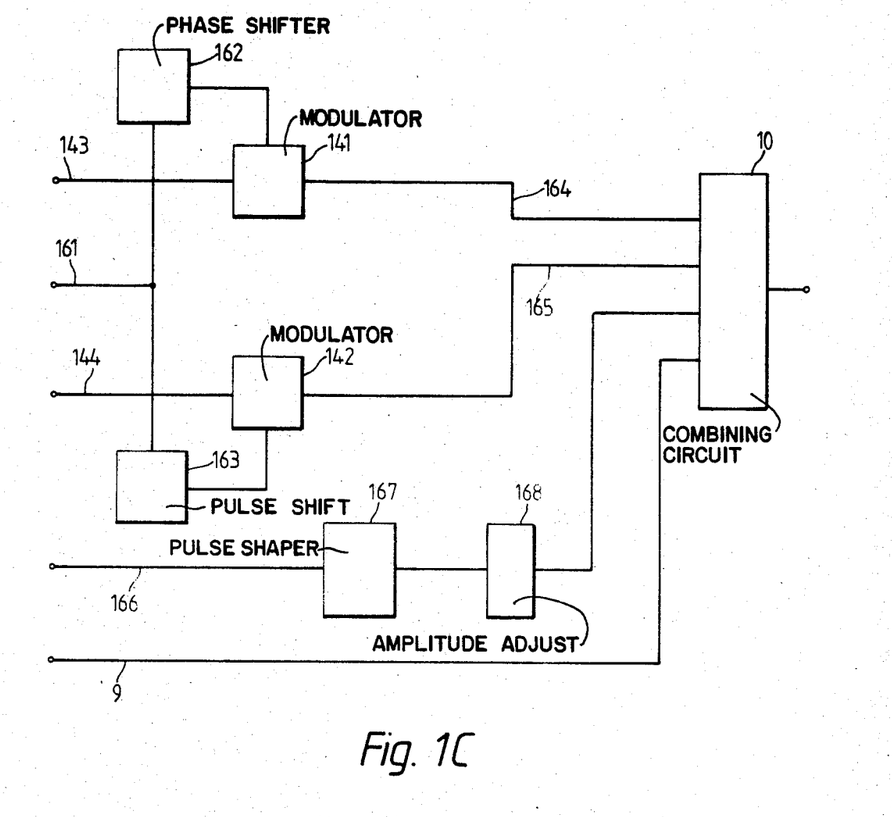

The embodiment shown in FIG. 1 includes an 8-bit bus 1 to which inputs of a buffer circuit 2 and address inputs of a read only memory (ROM) 3 are connected. A luminance signal in the form of an 8-bit parallel binary code produced by sampling the luminance signal at a rate of 13.5 MHz is applied by the bus 1 to inputs of the buffer circuit 2 and to address inputs of the ROM 3. An enable signal is applied to the buffer circuit 2 by a line 4 so that the buffer 2 is enabled during the line scan period and disabled during the blanking period. The outputs of the buffer circuit 2 are connected to a bus 5 as also are the inputs of a digital to analogue converter (DAC) 6. The DAC 6 operates under the control of a 13.5 MHz clock signal $f_s$ which is fed to a clock input thereof through a delay circuit 7. The delay introduced by this circuit is sufficient to ensure that the information on bus 5 has settled before the DAC 6 operates on it. The output of the DAC 6 is connected through a low pass filter 8 and a line 9 to a first input of a combining circuit 10. (FIG. 1C) The filter 8 is provided to smooth the output of the DAC 6 and to limit the frequency band of the luminance signal to the value specified in the appropriate systems standard, for example 0-5.5 MHz for the system specified in "Specification of Television Standards for 625 line system-I transmissions" published in the United Kingdom jointly by the Independent Television Authority and the British Broadcasting Corporation.

The luminance and chrominance signals have to be blanked at the end of each line scan period. The blanking is effected by applying enabling and disabling pulses to the buffer 2, the ROM 3, and a further ROM 26 which all have their outputs connected to the bus 5. The enabling and disabling pulses are generated by means of a shift register 12 and a read only memory (ROM) 17 which are clocked by the 13.5 MHz clock signal $f_s$. The signal labelled g) in FIG. 2, which is generated elsewhere in the system, marks the start of the blanking period and is applied via a line 11 to the input of the shift register 12. The shift register 12 is clocked by the 13.5 MHz clock signal $f_s$ and has four parallel outputs which are fed through four lines 13, 14, 15 and 16 to address inputs of the read only memory (ROM) 17. The signal on line 11 is also fed to a further address input of the ROM 17. Consequently at the start of the blanking period a logic '1' is shifted into the shift register 12 at each clock pulse $f_s$ and the sequence of addresses shown in Table I is generated.

TABLE I

| ROM 17 ADDRESS | | | | | ROM 17 OUTPUT | | | | |
| --- | --- | --- | --- | --- | --- | --- | --- | --- | --- |
| 11 | 13 | 14 | 15 | 16 | 4 | 20 | 21 | 22 | 23 |
| 1 | 0 | 0 | 0 | 0 | 0 | 1 | 0 | 0 | 0 |
| 1 | 1 | 0 | 0 | 0 | 0 | 1 | 0 | 1 | 0 |
| 1 | 1 | 1 | 0 | 0 | 0 | 1 | 1 | 0 | 0 |
| 1 | 1 | 1 | 1 | 0 | 0 | 1 | 1 | 1 | 0 |
| 1 | 1 | 1 | 1 | 1 | 0 | 0 | 1 | 1 | 1 |

A first output of the ROM 17 is connected through a line 4 to an enable input of the buffer 2 and to a first input of a latch 25. Second, third and fourth outputs of the ROM 17 are fed through lines 20, 21 and 22 to further inputs of the latch 25 and to address inputs of the ROM 3. A fifth output of the ROM 17 is fed to a fifth input of the latch 25 through a line 23 and also to an address input of the further ROM 26.

Figure 2:
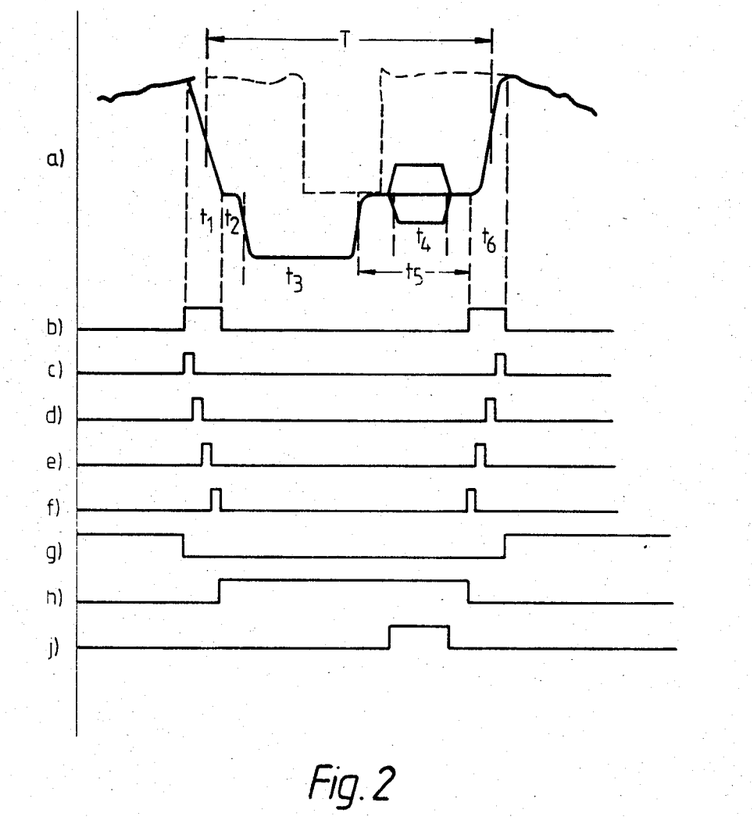
FIG. 2 shows the composite video waveform around the blanking period and signal waveforms at various points within the luminance channel of the arrangement shown in FIG. 1.

At the start of the blanking period the buffer 2 is disabled by the signal on line 4 which takes the form shown as waveform g) in FIG. 2. The ROM 3 is enabled by the signal on line 20 which takes the form of the signal shown as waveform b) in FIG. 2. After four clock pulses the ROM 3 is disabled and the ROM 26 is enabled by the signal on line 23 which takes the form shown as waveform h) in FIG. 2. At the end of the blanking period the signal on line 11 goes to a logic '0' and the sequence of addresses shown in Table II is generated.

TABLE 2

| ROM 17 ADDRESS | | | | | ROM 17 OUTPUT | | | | |
| --- | --- | --- | --- | --- | --- | --- | --- | --- | --- |
| 11 | 13 | 14 | 15 | 16 | 4 | 20 | 21 | 22 | 23 |
| 0 | 1 | 1 | 1 | 1 | 0 | 1 | 1 | 1 | 0 |

TABLE 2-continued

| ROM 17 ADDRESS | | | | | ROM 17 OUTPUT | | | | |
| --- | --- | --- | --- | --- | --- | --- | --- | --- | --- |
| 11 | 13 | 14 | 15 | 16 | 4 | 20 | 21 | 22 | 23 |
| 0 | 0 | 1 | 1 | 1 | 0 | 1 | 1 | 0 | 0 |
| 0 | 0 | 0 | 1 | 1 | 0 | 1 | 0 | 1 | 0 |
| 0 | 0 | 0 | 0 | 1 | 0 | 1 | 0 | 0 | 0 |
| 0 | 0 | 0 | 0 | 0 | 1 | 0 | 0 | 0 | 0 |

Thus the ROM 26 is disabled, the ROM 3 is again enabled for four periods of the clock $f_s$, and then the buffer 2 is enabled.

It should be noted that the signal on line 11 should be arranged to give the desired blanking time T and the precise timing of its rising and falling edges should be chosen to take into account the slopes of the blanking waveform generated by the ROM 17 and the clock pulses $f_s$.

The ROM 3 is organised in four sections which are selected by the signals on lines 21 and 22. The first section is programmed such that the output produced by the ROM 3 is equal to 80% of the luminance signal which is represented by the input address which is formed by the signal on bus 1, the second section is programmed so that the output is 60% of the luminance signal, the third section so that the output is 40% of the luminance signal and the fourth section so that the output is 20% of the luminance signal. By selecting each of the sections in turn a desired slope for the transitions of the blanking waveform can be achieved. It should be noted that the percentage figures given are by way of example and that the slope of the transitions may be modified by adopting a different percentage value from that specified in this example for one or more of the sections of the ROM 3. The output of the ROM 3 is fed through bus 5 to the input of the DAC 6. The blanking level is determined by the ROM 26 and during the period when the signal on line 23 is high a digital output is fed to the DAC 6 which defines the specified blanking level.

The chrominance channel is shown in FIG. 1B, and includes a 8-bit bus 101 which receives two time division multiplexed colour difference signals (B-Y) and (R-Y) in the form of sampled 8-bit digital signals. The sampling rate for the (B-Y) and (R-Y) signals is 6.75 MHz giving a data rate of 13.5 MHz. This signal is applied to a buffer circuit 102 and to address inputs of a read only memory 103. The buffer circuit 102 is enabled during the line scan periods by a signal on a line 104 which is essentially the same as the signal on line 4 but is clocked by the chrominance clock ($f_u,f_v$) rather than the luminance clock ($f_s$). The signal on line 104 is derived from a first output of the latch 25. The outputs of the buffer 102 are applied to a bus 105 and are demultiplexed by means of two latches 131 and 132 which have their inputs connected to bus 105. The latches are controlled by the chrominance clock having a first phase $f_u$ and a second phase $f_v$. The outputs of the latches 131 and 132 are fed to two digital to analogue converters 133 and 134 respectively, through respective data busses 135 and 136. The DACs 133 and 134 convert the signals at the outputs of the latches 131 and 132, respectively, to analogue signals and feed these analogue signals through respective low pass filters 139 and 140 to respective modulators 141 and 142. (FIG. 1C).

At the start of the blanking period the buffer 102 is disabled and the ROM 103 enabled for a period of four clock pulses $f_s$ in a similar manner to that described for the luminance channel. The ROM 103 is organised in four sections as is the ROM 3. However, the signals on lines 121 and 122 show differences from those on lines 21 and 22; the reason for this is that the (R-Y) and (B-Y) signals should be attenuated by the same factor and hence during the four clock periods that the ROM 103 is enabled only two levels of output signals are required. This is achieved by clocking the latch 25 with the chrominance clock $f_u$ rather than with the luminance clock $f_s$. (similarly the signals shown as waveforms f) and j) in FIG. 3 or in FIG. 4 are produced on lines 121 and 122. This means that, the output of the ROM 103 will produce 80% and 40% of the chrominance signal or 60% and 20% of the chrominance signal dependent on which phase of the clock signal $f_u$ coincides with the start of the blanking period but that both the (R-Y) and (B-Y) signals will be attenuated by the same amount.

At the end of four $f_s$ clock periods the ROM 103 is disabled and an enable signal derived from an output of the latch 25 appears on line 123. This enable signal is fed to one input of an AND-gate 150 whose output is fed to the enable input of a ROM 126. The ROM 126 which may be part of the ROM 103 produces the blanking level for the chrominance signal. During the period $t_4$ shown in FIG. 2a it is necessary to produce a burst of colour subcarrier. In order to achieve this object a signal on a line 151 is applied to the enable input of a ROM 152 which also may be part of the ROM 103. The signal on line 151 is also fed to a second input of the AND-gate 150 through an inverter 153. Thus, during the colour burst period the ROM 126 is disabled and the ROM 152 enabled. To determine the amplitude of the colour subcarrier burst an amplitude determining circuit 154 is connected through a bus 155 to address inputs of the ROM 152 the output of the ROM 152 being fed to the highway 105. The amplitude setting circuit 154 may be formed as a series of switches which will generate a predetermined digital code to adjust the required burst amplitude.

When coding these signals into the PAL system the phase of the (R-Y) signal needs to be switched on alternate lines. In order to achieve this function a signal on line 160 is fed to the DAC 134 to invert the (R-Y) signal before the digital to analogue conversion. A suitable digital to analogue converter for this purpose is that sold by T.R.W. Incorporated under the type No. TDC 1016J. Alternatively the inversion could be achieved by means of corresponding logic circuitry arranged before a conventional digital to analogue converter or by the circuit described in U.K. Patent Application No. 2087608A.

The filters 139 and 140 smooth the outputs of the DACs 133 and 144, respectively, and restrict the bandwidth of the analogue colour difference signals to the values prescribed in the appropriate standards for television broadcast signals. The output of filter 139 is fed through a line 143 to the first input of a first modulator 141 while the output of the filter 140 is fed through line 144 to the first input of a second modulator 142. A colour subcarrier signal is fed by a line 161 to second inputs of the modulators 141 and 142 via respective phase shifting circuits 162 and 163. The phase shifting networks 162 and 163 are arranged so that the colour subcarrier signal fed to the modulator 141 is advanced in phase by 90° with respect to the colour subcarrier signal fed to modulator 142. In this case the phase shifter 162 advances the phase of the colour subcarrier signal by 45° while the phase shifter 163 retards the phase of the colour subcarrier signal by 45°. The outputs of the modulators 141 and 142 are fed by lines 164 and 165 to second and third inputs of the combining circuit 10.

A synchronising pulse generated elsewhere is applied by a line 166 to a synchronising pulse shaper 167 and thence to an amplitude adjusting circuit 168. The output of the circuit 168 is fed to a fourth input of the circuit 10.

In response to the four input signals, the combining circuit 10 in which the four signals are added, produces an output of the form shown by the solid line in FIG. 2a. The specification for television signals referred to above gives the following figures for the times $t_1$ to $t_6$:

$t_1$ and $t_6$—line blanking rise time—300±100 ns,
$t_2$—front porch—1.55 μs±250 rs,
$t_3$—synchronising pulse—4.7 μs±100 ns,
$t_4$—back porch—5.8 μs±600 ns,
$t_5$—colour burst—2.25 μs±230 ns,
T—line blanking period—12.05 μs±250 ns.

It can be derived that with a clock rate of 13.5 MHz the periods $t_1$ and $t_6$ can be achieved by causing the blanking pulse to rise and fall over a period equal to 4 clock pulses and if the clock rate is precisely 13.5 MHz could also be achieved by causing the blanking pulse to rise and fall over a period equal to 3 or 5 clock pulses. For other specified rise and fall times or clock frequencies the number of clock periods may be appropriately increased or decreased.

Similarly it can be shown that the colour burst period $t_5$ may be 20 clock periods long and start 76 clock periods after the start of the blanking period. As can be seen from FIG. 1 the synchronising pulse is added as an analogue signal after the chrominance components has been converted to analogue signals and modulated onto the colour subcarrier.

In FIG. 2 the waveform b represents the signal applied on line 20 to the ROM 3 to enable the ROM 3. Waveforms c, d, e and f are decoded versions of the signals applied on lines 21 and 22 to the ROM 3, the ROM 3 containing a decoder to enable the four sections to be selected by means of two input lines. The waveform g is the enable signal for the buffer 2 which is fed on line 4. Waveform h is the enable signal for the ROM 26 on line 23 and waveform j is the colour burst gate signal which is fed to the ROM 152 in the chrominance channel via the line 151. The colour burst gate signal is generated elsewhere in the system.

Figure 3:
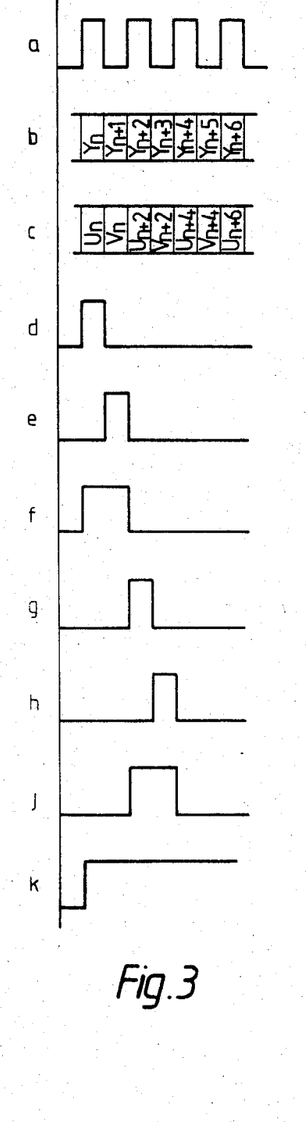
FIG. 3 shows waveforms at various points within the chrominance channel in the arrangement shown in FIG. 1 when the chrominance clock has a first phase.
Figure 4:
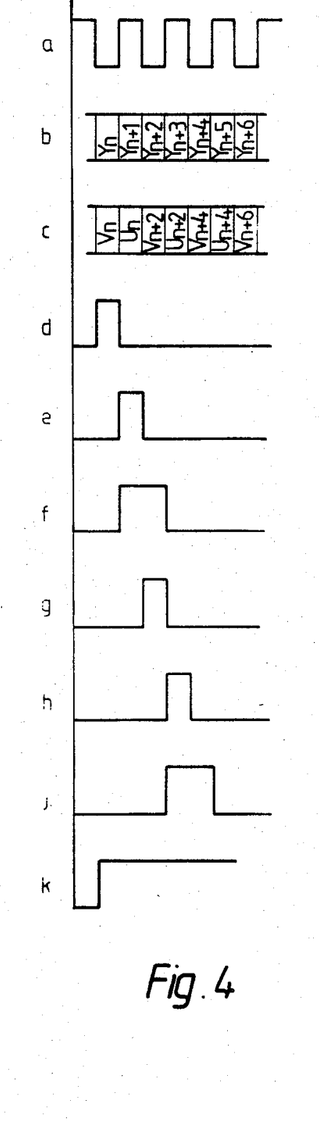
FIG. 4 shows equivalent waveforms to those shown in FIG. 3 when the chrominance clock has an opposite phase.

Waveform a in FIGS. 3 and 4 is the 6.75 MHz chrominance clock, waveform b represents the luminance data at 13.5 MHz repetition rate, and waveform c shows the multiplexed (R-Y) and (B-Y) chrominance signals at the 13.5 MHz data rate, the (R-Y) and (B-Y) signals each being at the rate 6.75 MHz. Waveforms d and e in FIGS. 3 and 4 are equivalent to the waveforms c and d in FIG. 2, waveform f shows the signal on line 121 and as can be seen the rising edge of waveform f in FIG. 3 corresponds with the rising edge of waveform d in FIG. 3 whereas in FIG. 4 the rising edge of waveform f corresponds with the rising edge of waveform e. When the rising edge of the chrominance clock coincides with the (B-Y) signal the waveforms illustrated in FIG. 3 are generated, thus the rising edge of the waveform f coincides with the start of the period $t_1$. If however, the rising edge of the chrominance clock coincides with the (R-Y) data then the rising edge of the waveform f will be delayed by 1 period of the 13.5 MHz clock. As can be seen from FIGS. 3 and 4 the pulse in waveform f lasts for two periods of the 13.5 MHz clock so that both the (R-Y) and (B-Y) data signals address the same section of the ROM 103. Consequently both the (R-Y) and (B-Y) signals are multipled by the same percentage. Similarly waveforms g and h in FIGS. 3 and 4 correspond to waveforms e and f in FIG. 2 and the rising edge of waveform j coincides with either the rising edge of waveform g or waveform h depending on the phase of the chrominance clock.

The arrangement described with reference to FIGS. 1 to 4 is suitable for producing from colour difference and luminance signals presented in digital form a composite video signal encoded according to the PAL system. In order to encode the composite video signal according to the NTSC or SECAM systems the arrangement may be modified in the following manner.

In the NTSC system there is no inversion of the R-Y signal and hence the facility for inverting the R-Y signal is not required. Consequently the line 160 conveying the PAL switch signal to the DAC 134 can be dispensed with and the DAC 134 does not need to be capable of inverting the signal on bus 136.

In the SECAM system the colour difference signals are interleaved and each colour difference signal transmitted on alternate lines, i.e. on line N the R-Y signal is used and on line N+1 the B-Y signal is used. The chrominance channel shown in FIG. 1B can be modified by deleting the latch 132, DAC 134 and filter 140 and gating the clock signal $f_u$ to the latch 131 with a pulse which is at a logical '0' for line N and a logical '1' for line N+1. This pulse which is called hereinafter the Alternate Line Pulse is combined with the clock signal $f_u$ in an exclusive OR gate so that during line N the latch 131 reads the B-Y signal from bus 105 and during line N+1 the latch 131 reads the R-Y signal from the bus 105. Thus during line N only the B-Y signals are read from the bus 105 and these are fed to a convention SECAM modulator. Similarly during line N+1 only the R-Y signals are read from bus 105 and these are fed to the SECAM modulator during line N+1. The modulator may, for example, take the form of that disclosed in U.K. Patent Specification No. 1554240, the input changeover switch shown in that specification being deleted as the line sequential signal is generated by the clock pulses applied to the latch 131.

I claim:

1. Apparatus for producing a composite video signal having predetermined blanking intervals with preselected transitions from the unblanked to the blanked and the blanked to the unblanked states in response to digital color difference signals and a digital luminance signal applied thereto, comprising means for processing said digital luminance and color difference signals to create processed digital luminance and color difference signals having a predetermined blanking amplitude during said predetermined blanking intervals and having said preselected transitions;

means for adding a color burst signal to said processed digital color difference signal thereby creating a final digital signal;

means connected to said processing means and said adding means for generating said composite video signal from said final digital signal and said processed digital luminance signal; and wherein said means for processing said digital color difference signals comprises first read-only memory means having a first and second set of first memory address inputs and a first memory enable input, means connecting said first set of first memory address inputs to receive said digital color difference signals, means for applying an enable signal to said first memory enable input during said transitions from said unblanked to said blanked and said blanked to said unblanked states, and means for applying further address signals to said second set of first memory inputs during said transition periods, said first read-only memory producing first memory output signals equal to predetermined percentages of said color difference signals, said predetermined percentages corresponding to said further address signals, said processing means further comprising second read-only memory means furnishing a digital blanking level signal when enabled, and means for enabling said second read-only memory means between said transitions from said unblanked to said blanked and said blanked to said unblanked states.

2. An arrangement as claimed in claim 1, wherein said means for generating said digital color burst signal comprises third read only memory means; an amplitude setting circuit for generating addresses for said third read only memory means; and means for feeding a burst enable signal to said third read only memory means, said burst enable signal defining the period of said color burst signal.

3. Apparatus for producing a composite video signal having a predetermined blanking amplitude during predetermined blanking intervals in response to digital color difference signals, a digital luminance signal and a color burst enabling signal applied thereto, comprising first means for processing said digital luminance and color difference signals to create a processed digital luminance signal and processed digital color difference signals having said predetermined blanking amplitude during said predetermined blanking intervals;

second means for generating a digital color burst signal in response to said color burst enabling signal; and third means connected to said first and second means for generating said composite video signal from said processed digital luminance and color difference signals and said digital color burst signal.

4. Apparatus as claimed in claim 3, further comprising means connected to said first means for inverting one of said digital color difference signals.

5. Apparatus for producing a predetermined blanking level during predetermined blanking intervals and predetermined transitions from the unblanked to the blanked and from the blanked to the unblanked states in a digital television signal, said predetermined transitions extending over respective time intervals exceeding zero, comprising:

memory means having a first and second set of memory address inputs and a memory enable input, means connecting said first set of memory address inputs to receive said digital television signal, means for applying an enable signal to said memory enable input during said transitions from said unblanked to said blanked and said blanked to said unblanked states, and means for applying further address signals to said second set of memory address inputs during said transition periods, said memory means producing memory output signals equal to predetermined percentages of said digital television signals, said predetermined percentage corresponding to said further address signals;

buffer means having a buffer output for transmitting said digital television signal in the absence of a blocking signal;

means for applying said block signal to said buffer means during said blanking intervals;

means for furnishing a digital blanking level signal during said blanking intervals; and combining means connected to said buffer output, said memory means and said digital blanking level signal furnishing means for combining said digital television signal, said digital blanking level signal and said memory output signals.

6. Apparatus as claimed in claim 5, wherein said television signal is a luminance signal.

7. Apparatus as claimed in claim 5, wherein said television signal is a color difference signal.

* * * * *